No. 778,974. PATENTED JAN. 3, 1905.
G. W. JACKSON.
BUNG.
APPLICATION FILED JAN. 15, 1902.

Witnesses
P. F. Nagle.
L. Douville.

Inventor
George W. Jackson
By Wiedersheim & Fairbanks,
Attorneys

No. 778,974. Patented January 3, 1905.

UNITED STATES PATENT OFFICE.

GEORGE W. JACKSON, OF PHILADELPHIA, PENNSYLVANIA, ASSIGNOR OF ONE-HALF TO JAMES M. TIGHE, OF PHILADELPHIA, PENNSYLVANIA.

BUNG.

SPECIFICATION forming part of Letters Patent No. 778,974, dated January 3, 1905.

Application filed January 15, 1902. Serial No. 89,871.

*To all whom it may concern:*

Be it known that I, GEORGE W. JACKSON, a citizen of the United States, residing in the city and county of Philadelphia, State of Pennsylvania, have invented a new and useful Improvement in Bungs, of which the following is a specification.

My invention comprises a novel bung for casks, barrels, or the like, together with a compressible packing-ring therefor.

It further consists of novel features of construction, all as will be hereinafter fully set forth.

Figure 1:
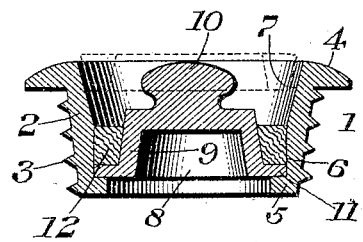
Figure 2:
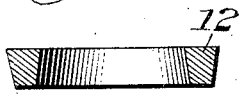

Figure 1 represents in vertical section a bung embodying my invention. Fig. 2 represents a similar view of a packing-ring before its insertion in the bung.

Similar numerals of reference indicate corresponding parts in the figures.

Referring to the drawings, 1 designates a bush having an annular wall 2, provided exteriorly with a thread 3, adapted to engage with the bung-hole of a cask. At the upper end of the wall 2 is a horizontal flange 4 of ordinary construction. At the lower end of the wall 2 is an annular inwardly-projecting flange 5. As shown, the interior of the wall 2 has a substantially vertical portion 6 at its lower end and a flaring portion 7 thereabove. Within the bush 1 is seated a bung 8, having a tapered wall 9, surmounted by a knob or handle 10 and having at its lower end an outwardly-extending flange 11, shown as of a diameter substantially equal to that of the cylindric portion 6 of the wall 2, although the size of the flange is obviously non-essential. An annular packing-ring 12 is shown as having both its inner and outer walls somewhat tapering. This ring is made of a compressible absorbent material, as wood or the like, and is of a thickness somewhat greater than the space between the walls of the bush and the bung.

The operation is as follows: The bush 1 having been screwed into the bung-hole of the barrel, the bung 8 is seated therein with its flange 11 resting on the flange 5 of the bush. The packing-ring 12 is then forcibly driven into the space between the wall 9 of the bung and the portion 6 of the wall 2 of the bush. By reason of its compression it will form a seal to prevent any leakage from the barrel or cask, the efficiency of the seal being increased by the swelling of the ring due to its absorption of any liquid which may seep thereinto.

Having thus described my invention, what I claim as new, and desire to secure by Letters Patent, is—

1. A barrel-stopper comprising a bush having the inner face of its annular wall substantially vertical at its lower end and flaring outwardly thereabove and having an inwardly-extending flange at its lower end, a vertically-insertible bung having a body of less diameter than said bush-wall and a flange at its lower end substantially filling said bush and a compressible packing-ring of absorbent material of a thickness normally greater than the space between said bung-body and said bush-wall, said packing-ring forming the means for retaining said bung in said bush and being removable with said bung.

2. A barrel-stopper, comprising a bush, having the inner face of its annular wall approximately vertical at its lower end and having an inwardly-extending flange at the foot of said wall, a vertically-insertible bung having a body of less diameter than said bush-wall and having a flange at its lower end adapted to seat upon the flange in said bush, a compressible packing-ring of absorbent material of a thickness normally greater than the space between said bung-body and said bush-wall, said packing-ring forming the means for retaining said bung in said bush and being removable with said bung.

GEORGE W. JACKSON.

Witnesses:
JOHN A. WIEDERSHEIM,
HENRY COBB KENNEDY.